Jan. 22, 1963

C. W. EASTEP 3,074,290

POWER TRANSMISSION CHAIN

Filed Jan. 11, 1960

Inventor:
Calvin W. Eastep
By Joseph R. Dwyer
Atty.

United States Patent Office 3,074,290
Patented Jan. 22, 1963

3,074,290
POWER TRANSMISSION CHAIN
Calvin Walter Eastep, Trumansburg, N.Y., assignor to Morse Chain Company, Ithaca, N.Y., a corporation of New York
Filed Jan. 11, 1960, Ser. No. 1,617
1 Claim. (Cl. 74—250)

The present invention relates, in general, to roller chains of the power transmission type, and, more particularly, to roller chains having a new and improved link plate construction.

In present day roller chains for the transmission of power, there are certain dimensional limitations or standards imposed upon chain manufacturers so that roller chains of one manufacturer may be interchangeable with, or coupled to, chains of another manufacturer. A roller chain made according to these standards has prescribed roller width, roller diameter, pin diameter, plate thickness as well as other components of the roller chain which affect this interchangeability. Such chain made according to these standards is conventionally referred to as ASA standard roller chain, and its power characteristics is rated according to its plate fatigue limits, roller impact fatigue limits, and its top speed limits.

As can be appreciated, these dimensional parameters raise certain structural problems in order for the necessary power characteristics of the chain to be attained for a particular load specification. One of these problems concerns the pin members and their respective link plates and the manner that the load is distributed when the chain is in tension.

At present there is a tendency for the pin members to warp which results in greater stress concentration on the link plates where the pins join the link plates with accompanying increased failures.

Another problem is with reference to rollers used in conventional roller chain. With the outside diameters specified by the ASA codes and with the inside diameter at present a function of pin diameter plus bushing thickness, only a limited amount of changes may be made to increase the endurance or impact fatigue limit of the roller.

With a roller chain constructed in accordance with the teachings of this invention, it has been found that the tendency of the pin members to warp has been considerably reduced over that of the conventional pin members and the thickness of the roller has been increased which automatically increases the endurance limit of the roller.

Accordingly, it is a principal object of this invention to provide a power transmission roller chain having greatly increased life properties within the dimensional limits imposed by the ASA codes.

Still another object of this invention is to provide a power transmission roller chain having reduced pin bending under tension.

Still another object of this invention is to provide a power transmission roller chain having rollers with increased impact fatigue life which rollers are compatible with size required by the ASA codes.

As will be more apparent from the more detailed description hereinafter, the above objects are accomplished by a power transmission roller chain constructed in accordance with the teachings of this invention where such chain incorporates a more even distribution of the load on the individual chain links and thus reduces pin bending by embodying four planes of shear in a single strand width of chain as contrasted to two planes of shear of a conventional roller chain and by providing an arrangement whereby the roller may rotate directly on the pin which approximately doubles the roller wall thickness over conventional roller chains. The provision of the four planes of shear acting on the pin member has an advantage in addition to reducing pin bending in that it reduces pin shearing and thus increases the static load capabilities of the pin member.

Accordingly, a more specific object of this invention is to provide a new and improved power transmission chain having four planes of shear in a single strand width when the chain is placed in tension thus reducing bending of the pins of the chain by a more even distribution of force throughout its length and by reducing the tendency of the pins to shear.

Still another object of this invention is the provision of a new and improved power transmission chain having improved roller impact fatigue life by the arrangement whereby the inner diameter of the bores of rollers may be reduced to increase the wall thickness of the rollers and thus increase its impact fatigue life.

Further objects and advantages of the present invention will be apparent from the following description, reference being had to the accompanying drawings wherein preferred forms of the present invention are clearly shown.

Figure 1:
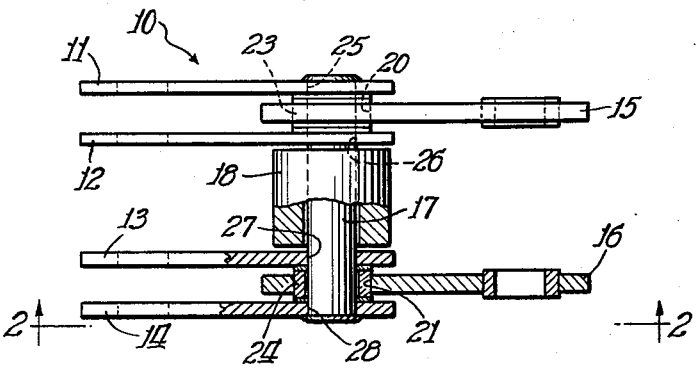
FIGURE 1 is a sectional view, partially broken away to illustrate to advantage a chain constructed in accordance with the teachings of this invention.
Figure 2:
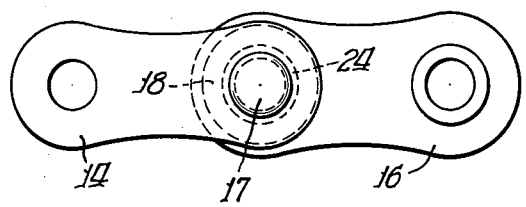
FIGURE 2 is a side view of the chain shown in FIGURE 1 taken along line 2—2 of FIGURE 1 and looking in the direction of the arrows.

Referring now to the drawings and in particular to FIGURES 1 and 2 thereof, it can be seen that a single strand width of chain link assembly, constructed in accordance with the teachings of this invention and indicated in its entirety as 10, comprises a plurality of links including relatively thin guide links or pin link plates 11 and 12, 13 and 14 disposed in pairs on opposite sides of relatively thick articulate links or roller plates 15 and 16 and pin link plates 11, 12, 13 and 14 are operatively disposed on a pin member 17 with a roller 18 disposed to rotate upon pin 17.

In the embodiment illustrated, roller plates 15 and 16 are each respectively apertured at 20 and 21 to each receive a bushing 23 and 24 press fitted therein. Plates 11–14 are each also respectively apertured as illustrated at 25, 26, 27 and 28, to accommodate the pin 17 to form a complete pin link assembly. Preferably, the pin 17 is press fitted into the pin link plates 11–14 and preferably the bushings are press fitted into the roller link plates 15 and 16 as illustrated although bushings are not required depending upon the material of the pin link plates and the pin 17.

It is important to note that the pin link plates 11–14 assembled in the manner illustrated are each one-half the thickness of the plates 15 and 16 according to the teachings of this invention so that the total width of the assembly can meet the requirements of the ASA standards and be accommodated on a conventional sprocket.

As also can be appreciated, when this assembly forms a part of the complete chain the load on the chain in tension is thus distributed into four shear planes as contrasted to the conventional chain. To illustrate more clearly, when the chain is in tension the load on the pin 17 is distributed between the roller plates 15 and 16 which tend to pull the pin to the right and pin link plates 11–14 which tend to pull the pin to the left as shown in the drawings. In this manner the load on the pin is distributed over a greater length of the pin than the load would be distributed were this a conventional chain utilizing only one pin link plate and one roller link plate on each side of the centrally located bushing. Too, with the roller link plates being sandwiched between the pin link plates, any tendency of the pin to shear is distributed between each roller link plate and its respective pairs of pin link plates (viz. roller link 15 and pin link plate 11 and 12). This reduces the tendency of shear in a chain constructed in accordance with the teachings of this invention by having two planes of shear at each end of the pin as contrasted to a conventional chain having only one shear plane with only one roller plate and one pin link plate at each end of the pin.

As hereinabove mentioned the more even distribution of the load on the pin has reduced the tendency of pins to bend and has reduced stress concentrations and has raised the endurance limit and load level of the chain.

As hereinabove mentioned also, another advantage in constructing a chain in accordance with the teachings of this invention is that roller life is increased. This is accomplished in the instant invention, as can be seen in the drawings, by constructing the bushings 23 and 24 so that they do not extend the length of the pin, as in the case of conventional chains, but terminate within the pairs of link plates 11—12 and 13—14 so that the roller 17 rotates directly on the pin and requires no separate bearing bushing. This is accomplished by the fact that the inside link plates 12 and 13 are prestressed on the pin, making it unnecessary to use the roller as a spacer, as in conventional chain. Thus, it is possible to decrease the inside diameter of the roller by reason of the fact that the bearing bushing between the two inside link plates 12 and 13 has been eliminated. With this decrease in inside diameter of the bore of the rollers, the increased thickness of the roller working material permits greater loading and greater fatigue properties.

Figure 3:
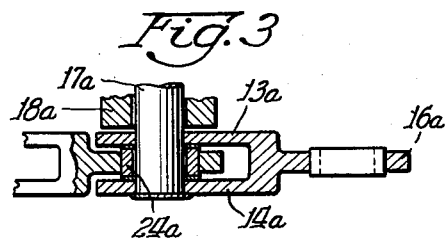
FIGURE 3 is a partial sectional view of a chain constructed in accordance with the teachings of this invention for specific applications where the link plates are not of a material which may be stamped.

Turning now to FIGURE 3, it can be seen that the invention disclosed herein comprehends a clevis type link having a head portion 16a and a pair of yoked portions 13a and 14a. Since the side wall thickness of the yokes 13a and 14a are one-half of the thickness of the side walls of the head portion 16a, the over-all dimensional characteristics of the assembly constructed in accordance with the teachings of this disclosure will have the same general characteristics as to shear planes, load distribution on the pin 17a and roller fatigue properties of roller 18a as that illustrated and described in FIGURES 1 and 2. This FIGURE 3 illustrating the clevis type link plate assembly is particularly well suited, however, for link plates made with a material which cannot be stamped as, for example, made with a material such as plastic and/or glass or the like and as illustrated, the bushing 24a may be press fitted into the head 16a in a manner identical to that described in connection with bushing 24.

Figure 4:
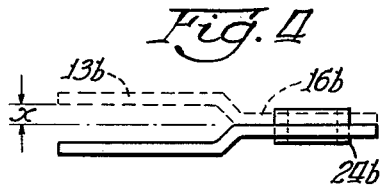
FIGURE 4 is a view of the link utilizing stamped material but like the chain shown in FIGURE 3.

As also illustrated in FIGURE 4 it can be seen that this invention also comprehends the use of a pair of stamped link plates formed to define a clevis link plate to operate in a manner illustrated in connection with FIGURE 3. By so constructing the clevis plate as shown, the fatigue life and tensil strength of such link plates has been increased over that of conventional chain type link plates because, as can be seen, the amount of off-set between the yoke 13b and the head 16b, that is, the distance x as shown in the drawings, is less than that of a conventional off-set pin link plate where the entire thickness of the adjoining link plate is equal to the width of the head 16b. With the stamped link plates so constructed and with the bushing 24b press fitted into the head 16b identical with that described in connection with FIGURES 1–3, it can be seen that this plate will meet the requirements of the ASA standards and yet will have the same general characteristics as to shear planes, load distribution on the pin and roller fatigue properties as that illustrated in FIGURES 1–3.

Figure 5:
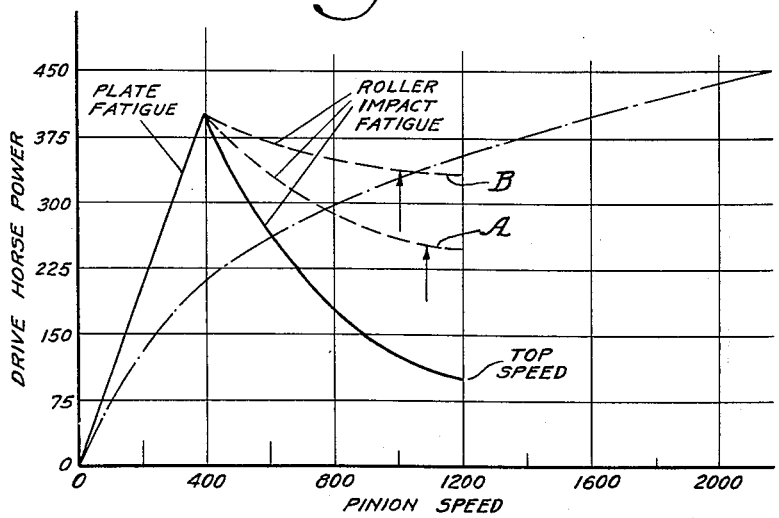
FIGURE 5 is a horse power capacity chart indicating the limitations of plate fatigue, roller impact fatigue and top speed and the manner in which the rating of the chain is increased when the chain is constructed in accordance with the teachings of this invention.

Turning now to FIGURE 5 where there is illustrated the horse power capacity chart of a power transmission chain and the manner in which chain is rated, it can be seen that the metallurgical properties and the top speed limitations of the chain are a function of roller fatigue, plate fatigue and top speed limitations. This is illustrated in the solid lines identified as plate fatigue, roller impact fatigue and top speed of a particular size chain made in a conventional manner. With the roller fatigue life increased merely by the increase in size of the walls of the roller, such as, for example, shown at lines A and B, it is readily apparent that the endurance of the chain constructed in accordance with this invention is materially improved yet the chain is interchangeable with conventional chain.

From the above description it can be seen that the invention comprises a roller chain of the high power transmission type which has simplicity of design and which is changeable with and can be coupled to ASA standard conventional chain yet can be stamped, passed, forged or molded and will have increased life and greater load capacities. While this invention has been described in connection with only one end of the respective roller link plate or pin link plates, it is to be understood that the construction of the entire link assembly and the entire chain can be made identical with that shown and described.

While this invention has been described in connection with certain specific embodiments thereof, it is to be understood that it is by way of illustration and not by way of limitation.

I claim:

A power transmission chain having a plurality of strands positioned in parallel relationship, said strands comprising a series of adjacent link plates, said link plates having a bifurcated guide portion formed on one end and an articulate portion formed on the other end, said guide portion having substantially the same cross-sectional area as said articulate portion, said articulate portion being interpositioned between the branches of the bifurcated guide portion of an adjacent link plate, said interpositioned guide and articulate portions having aligned apertures formed therein and through said parallel strands for receiving a pin to articulately interconnect the adjacent link plates, a pin inserted in each of the aligned respective apertures for articulately interconnecting the interpositioned respective end portions of each link of each strand, a bearing bushing press-fitted into each aperture formed in each articulate end portion and rotatably disposed on said pin, each of said bushings being disposed between the branches of respective adjacent bifurcated portions, and a roller rotatably mounted on said pin between the strands.

References Cited in the file of this patent

UNITED STATES PATENTS

| | | |
|---|---|---|
| 449,997 | Brampton | Apr. 7, 1891 |
| 653,374 | Barry | July 10, 1900 |
| 764,901 | Schildknecht | July 12, 1904 |
| 1,031,499 | Wilkin | July 2, 1912 |
| 1,624,111 | Mullally | Apr. 12, 1927 |
| 2,869,379 | Welser | Jan. 20, 1959 |

FOREIGN PATENTS

| | | |
|---|---|---|
| 212,083 | Germany | July 21, 1909 |